(12) United States Patent
Schachter et al.

(10) Patent No.: US 12,093,636 B2
(45) Date of Patent: *Sep. 17, 2024

(54) UNIFORM RESOURCE LOCATOR SUBSCRIPTION SERVICE

(71) Applicant: Pinterest, Inc., San Francisco, CA (US)

(72) Inventors: Joshua Schachter, Mountain View, CA (US); Albert Wenger, Scarsdale, NY (US)

(73) Assignee: Pinterest, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/367,272

(22) Filed: Jul. 2, 2021

(65) Prior Publication Data

US 2021/0334451 A1   Oct. 28, 2021

Related U.S. Application Data

(63) Continuation of application No. 15/246,974, filed on Aug. 25, 2016, now Pat. No. 11,055,476, which is a (Continued)

(51) Int. Cl.
*G06Q 30/00* (2023.01)
*G06F 3/0482* (2013.01)
(Continued)

(52) U.S. Cl.
CPC .......... *G06F 40/134* (2020.01); *G06F 3/0482* (2013.01); *G06F 16/93* (2019.01);
(Continued)

(58) Field of Classification Search
CPC .................................... G06Q 50/01
See application file for complete search history.

(56) References Cited

U.S. PATENT DOCUMENTS 6,009,410 A   12/1999   LeMole et al.
6,141,010 A   10/2000   Hoyle
(Continued)

OTHER PUBLICATIONS

Daily, G. (Apr. 2005//). Aggregating the aggregators: RSS reader round-up. EContent, (Year: 2005).*
(Continued)

*Primary Examiner* — Matthew L Hamilton
(74) *Attorney, Agent, or Firm* — Athorus, PLLC

(57) ABSTRACT

A system is provided that permits the use of classification information that can be interpreted by a computer system. To this end, a system and method may be provided for creating classification information that may be interpreted by a computer system. Such classification information may be associated with content, and permit a computer system to process the content based on the classification information. In one example, classification information may be associated by a user, system, or process with a portion of content, and a computer system processes the content based on the classification information. For instance, the classification information may cause content to be processed in a particular way, be presented to a user by a particular application program, cause the content to be forwarded to a particular user, or otherwise influence how the content is handled.

18 Claims, 10 Drawing Sheets

Related U.S. Application Data continuation of application No. 14/206,987, filed on Mar. 12, 2014, now abandoned, which is a continuation of application No. 11/586,068, filed on Oct. 25, 2006, now abandoned, and a continuation of application No. 11/273,580, filed on Nov. 14, 2005, now Pat. No. 8,768,772, which is a continuation-in-part of application No. 11/231,337, filed on Sep. 20, 2005, now abandoned.

(51) Int. Cl.
| | |
|---|---|
| G06F 16/93 | (2019.01) |
| G06F 16/955 | (2019.01) |
| G06F 40/117 | (2020.01) |
| G06F 40/134 | (2020.01) |
| G06Q 10/10 | (2023.01) |
| G06Q 30/0241 | (2023.01) |
| G06Q 50/00 | (2012.01) |
| G06Q 50/18 | (2012.01) |

(52) U.S. Cl.
CPC ...... *G06F 16/9562* (2019.01); *G06F 16/9566* (2019.01); *G06F 40/117* (2020.01); *G06Q 10/10* (2013.01); *G06Q 30/0241* (2013.01); *G06Q 30/0277* (2013.01); *G06Q 50/01* (2013.01); *G06Q 50/184* (2013.01)

(56) References Cited

U.S. PATENT DOCUMENTS

| | | | |
|---|---|---|---|
| 6,223,178 B1 | 4/2001 | Himmel et al. | |
| 6,311,194 B1 | 10/2001 | Sheth et al. | |
| 6,321,228 B1* | 11/2001 | Crandall | G06F 16/951 |
| 6,427,175 B1 | 7/2002 | Khan et al. | |
| 6,557,028 B2 | 4/2003 | Cragun | |
| 6,892,181 B1 | 5/2005 | Megiddo et al. | |
| 6,950,861 B1 | 9/2005 | Amro et al. | |
| 7,055,094 B2 | 5/2006 | Imielinski et al. | |
| 7,523,096 B2 | 4/2009 | Badros et al. | |
| 7,603,352 B1* | 10/2009 | Vassallo | G06Q 30/00 |
| 7,668,821 B1 | 2/2010 | Donsbach et al. | |
| 8,341,219 B1 | 12/2012 | Young | |
| 8,346,950 B1 | 1/2013 | Andreessen et al. | |
| 8,364,718 B2 | 1/2013 | Kirby | |
| 2001/0007980 A1 | 7/2001 | Ishibashi et al. | |
| 2002/0095443 A1 | 7/2002 | Kovack | |
| 2002/0178015 A1 | 11/2002 | Zee | |
| 2002/0178223 A1 | 11/2002 | Bushkin | |
| 2002/0184095 A1 | 12/2002 | Scullard et al. | |
| 2003/0009521 A1 | 1/2003 | Cragun | |
| 2003/0080986 A1 | 5/2003 | Baird | |
| 2003/0115167 A1* | 6/2003 | Sharif | G06F 3/04892 |
| 2004/0018125 A1 | 1/2004 | Yang et al. | |
| 2004/0181525 A1 | 9/2004 | Itzhak et al. | |
| 2005/0114357 A1 | 5/2005 | Chengalvarayan et al. | |
| 2005/0261962 A1 | 11/2005 | Chuah | |
| 2005/0267973 A1* | 12/2005 | Carlson | H04L 67/306 709/228 |
| 2005/0289147 A1* | 12/2005 | Kahn | G06F 16/972 |
| 2006/0026147 A1* | 2/2006 | Cone | G06F 16/9536 |
| 2006/0047643 A1 | 3/2006 | Chaman | |
| 2006/0242178 A1 | 10/2006 | Butterfield et al. | |
| 2006/0242554 A1* | 10/2006 | Gerace | G06Q 30/02 715/209 |
| 2006/0282328 A1 | 12/2006 | Gerace et al. | |
| 2006/0288011 A1* | 12/2006 | Gandhi | H04L 67/02 |
| 2007/0011155 A1 | 1/2007 | Sarkar | |
| 2007/0028171 A1 | 2/2007 | MacLaurin | |
| 2007/0033531 A1 | 2/2007 | Marsh | |
| 2007/0067297 A1 | 3/2007 | Kublickis | |
| 2007/0083894 A1* | 4/2007 | Gonsalves | G06F 16/958 725/35 |
| 2007/0124208 A1 | 5/2007 | Schachter et al. | |
| 2007/0226077 A1 | 9/2007 | Frank et al. | |
| 2007/0299978 A1 | 12/2007 | Neumann et al. | |
| 2008/0082673 A1* | 4/2008 | Dynin | G06F 16/9562 709/228 |
| 2008/0086471 A1 | 4/2008 | Ritter et al. | |
| 2008/0086496 A1 | 4/2008 | Kumar et al. | |
| 2008/0147810 A1 | 6/2008 | Kumar et al. | |
| 2008/0319955 A1 | 12/2008 | Douglass et al. | |
| 2009/0006442 A1 | 1/2009 | Anderson et al. | |
| 2009/0144254 A1* | 6/2009 | O'Sullivan | G06Q 30/02 707/999.005 |
| 2009/0241017 A1 | 9/2009 | Brooks et al. | |
| 2010/0077300 A1* | 3/2010 | Dugan | G06F 16/9562 715/273 |
| 2010/0083158 A1* | 4/2010 | Adler | G06F 16/958 715/771 |
| 2010/0087099 A1 | 4/2010 | Fadell et al. | |
| 2010/0115596 A1 | 5/2010 | Horozov et al. | |
| 2014/0229811 A1* | 8/2014 | Dynin | G06F 16/9562 715/205 |
| 2014/0281861 A1 | 9/2014 | Schachter et al. | |
| 2016/0343037 A1* | 11/2016 | Nicholas | G06Q 30/0269 |

OTHER PUBLICATIONS

Gordon-Murnane, L., "Social Bookmarking, Folksonomies, and Web 2.0 Tools", Searcher 14.6:26-38, Information Today, Inc., Jun. 2006 [accessed Feb. 10, 2021 via ProQuest] (Year: 2006).

International Search Report for International Application No. PCT/US2006/044101, dated Mar. 20, 2008.

* cited by examiner

UNIFORM RESOURCE LOCATOR SUBSCRIPTION SERVICE

RELATED APPLICATIONS

This application is a continuation of and claims the benefit of the filing date of U.S. application Ser. No. 15/246,974, titled "PROCESSING WEB PAGE DATA ACROSS NETWORK ELEMENTS", filed on Aug. 25, 2016, which is a continuation of U.S. application Ser. No. 14/206,987, titled "METHOD AND APPARATUS FOR TAGGING DATA", filed on Mar. 12, 2014, which is a continuation of U.S. application Ser. No. 11/586,068, titled "METHOD AND APPARATUS FOR TAGGING DATA", filed on Oct. 25, 2006, which is a continuation-in-part of U.S. Application entitled "SYSTEM AND METHOD FOR SELECTING ADVERTISING" by J. Schachter, et al. filed Sep. 20, 2005, Ser. No. 11/231,337, and is a continuation-in-part of U.S. Application entitled "SYSTEM AND METHOD FOR SELECTING ADVERTISING IN A SOCIAL BOOKMARKING SYSTEM" by J. Schachter, et al. filed Nov. 14, 2005, Ser. No. 11/273,580, all of which are incorporated herein by reference for all purposes.

BACKGROUND

Field of the Invention

The field of the invention relates generally to Internet technologies, and more specifically, to web-based classification of data.

Discussion of the Related Art

There are a number of systems that permit a user to associate content with classification data. One form of classifying information includes what is referred to in the art as a "tag." Tagging content is useful for many reasons. For instance, a user may construct their own organizational structures (e.g., tags, directories, folders, etc.) for organizing information. Such information may be, for example, file information in a file system, application data accessible in an application, or any other information that is suitable to be organized or classified. By organizing data, such data may more quickly located by users.

Recently, systems have become commonplace for permitting users to share classification information. One such system includes what is referred to as a social bookmarking system. In such a system, multiple users associate classifications (e.g., "tag" information) with resources available in a distributed computing network. The classification information may be, for example, in the form of one or more "tags" associated with content such as that available through the Internet. These tags each may include a single-word keyword defined by a user to describe referenced content.

Social bookmarking systems are typically used to organize references to content (e.g. URLs), and associate classification information with such references. Examples of such systems include the del.icio.us bookmarking system and Internet service, available at http://del.icio.us, the Spurl-.net bookmarking system and service available at http://www.spurl.net, among others. In such systems, a user associates words or other classification information that have specific meaning to the user so that the user may more easily organize and retrieve such information in the future.

SUMMARY

It is appreciated that in conventional social bookmarking systems, classification information such as tags only has meaning for the user. According to one embodiment, it may be desirable to permit the use of classification information that can be interpreted by a computer system. To this end, a system and method may be provided for creating classification information that may be interpreted by a computer system. Such classification information may be associated with content, and permit a computer system to process the content based on the classification information.

In one example, classification information may be associated by a user, system, or process with a portion of content, and a computer system processes the content based on the classification information. For instance, the classification information may cause content to be processed in a particular way, presented to a user by a particular application program, cause the content to be forwarded to a particular user, or otherwise influence how the content is handled.

The classification information may be machine-generated or user generated. For instance, the classification information may be generated by an analysis of the content by a process executing on a computer system. In one specific example, a file may be analyzed to determine its data type, and in response, classification information may be generated and associated with the file. In the case where a user generates classification information, the user may associate classification information in a conventional way (e.g., within a social bookmarking application), however, the classification information may have a predetermined format that permits the classification information to be understood by a computer system.

According to one embodiment, the classification information may be stored as part of the content in a memory of the computer system. In another embodiment, the classification information may be stored by a social bookmarking system. For instance, classification may be stored in one or more server-based systems and/or be distributed among one or more computers.

According to one embodiment, the classification information may be used alone or in addition to any other classification information associated with the content. In one specific example, a computer process may generate classification information automatically, and associate such information with the content. The classification information may be machine-generated or user generated, or any combination thereof.

As discussed, classification information may be in the form of one or more "tags." According to one embodiment, these tags may have a structured format to permit a computer system to interpret them. In one implementation, such tags may have more than one part. For instance, a multipart tag may be defined that includes information that specifies a parameter that may be interpreted by a computer, along with one or more values of that parameter. In one example, the parameter may indicate a location of the content (e.g., parameter equal to "location") and a value associated with that location (e.g., an address, longitude/latitude value, etc.). Further, such parameter type (e.g., a "location" type) may have one or more subtypes (e.g., a "latitude" subtype, a "longitude" subtype, etc.). Multipart tags contrast to conventional tags which generally include a single descriptive term (e.g., a keyword) used to describe or classify the referenced content.

Such a tag format may be useful for permitting an application to perform functions based on the classification information. For instance, a tag that specifies a location of the content may be used by an application to determine how close the content (e.g., a restaurant listing or website) may be to a client computer's location. A web browser program or other application program type may be configured to inspect a value associated with the tag, and perform one or more actions based on the value.

Further, such a tag format may be useful for encoding application-specific information. For instance, tag information may be used to drive a user interface for an application program. In one example implementation, tag information associated with a file may be used to determine how the file will be displayed to a user. In one example, the file may be a media file, and the tag may specify a media type of the file. The method by which the media type may be displayed in the interface may be determined based on the value of the tag. In this way, different media types may be analyzed and handled based on their tag data.

According to one embodiment, it is appreciated that classification methods discussed herein may be used to permit data to be shared beyond application program boundaries. For instance, in the case of content tagged with date and/or time information. A collection of items tagged with date and time tags could be displayed by an application program in a calendar-like format in a user interface. Similarly, a program may provide a calendar to another program (e.g., via an Application Program Interface (API), RSS, or other interface in a calendar format (e.g., iCal format)). Thus, classification information may be used to standardize content format, allowing data to be shared across platforms, systems, and applications.

According to one embodiment, a method for processing content in a distributed computer system is provided. The method comprises acts of collecting classification data in the distributed computer system, wherein at least one portion of the classification data includes a classification of content, and processing the content based on the classification of content. According to one embodiment, the method further comprises an act of generating, by a computer system, the classification of content. According to another embodiment, the method further comprises an act of generating, by a user, the classification of content. According to another embodiment, the act of processing further comprises an act of processing, by a computer system, the content based on the classification of content. According to another embodiment, the method further comprises an act of inspecting the classification of content and performing an action based on the classification.

According to one embodiment, the action is performed responsive to a user entering the classification data into a social bookmarking system. According to another embodiment, the act of collecting classification data further comprises an act of collecting one or more tags. According to another embodiment, the act of collecting the classification data further comprises an act of determining a classification performed through a user action. According to another embodiment, the act of determining includes determining whether the user associated the content with a particular classification. According to another embodiment, one or more tags include one or more keywords that describe the content.

According to one embodiment, the act of collecting the one or more tags further comprises an act of collecting the one or more tags by a collaborative computer system operated by the plurality of users. According to another embodiment, the act of collecting classification data is performed by a plurality of computer systems. According to another embodiment, the classification data is shared among a plurality of computer systems. According to another embodiment, the content is referenced by reference data, and wherein the act of collecting includes an act of associating the classification data with the reference data. According to another embodiment, the reference data includes a Uniform Resource Locator (URL).

According to one embodiment, the classification data is shared among a plurality of application programs. According to another embodiment, the classification data is shared among a plurality of users. According to another embodiment, the classification data is shared among a plurality of computer systems. According to another embodiment, the method further comprises an act of storing the classification data in the distributed computer system. According to another embodiment, the classification data is shared among at least one of a plurality of computer systems, a plurality of users, and a plurality of programs.

According to one embodiment, at least one of the one or more tags comprises a plurality of parameters. According to another embodiment, at least one parameter of the at least one tag indicates a tag type. According to another embodiment, at least one other parameter of the at least one tag indicates a tag subtype associated with the tag type. According to another embodiment, at least one other parameter of the at least one tag indicates a value associated with the tag type. According to another embodiment, the method further comprises an act of performing an action associated with the content based on the tag type.

According to one embodiment, the method further comprises an act of performing an action associated with the content based on the tag value. According to another embodiment, the act of performing an action is performed by a computer system. According to another embodiment, the act of performing an action is performed by a computer system associated with a social bookmarking system. According to another embodiment, the act of performing an action is performed by a software program adapted to process tag information.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
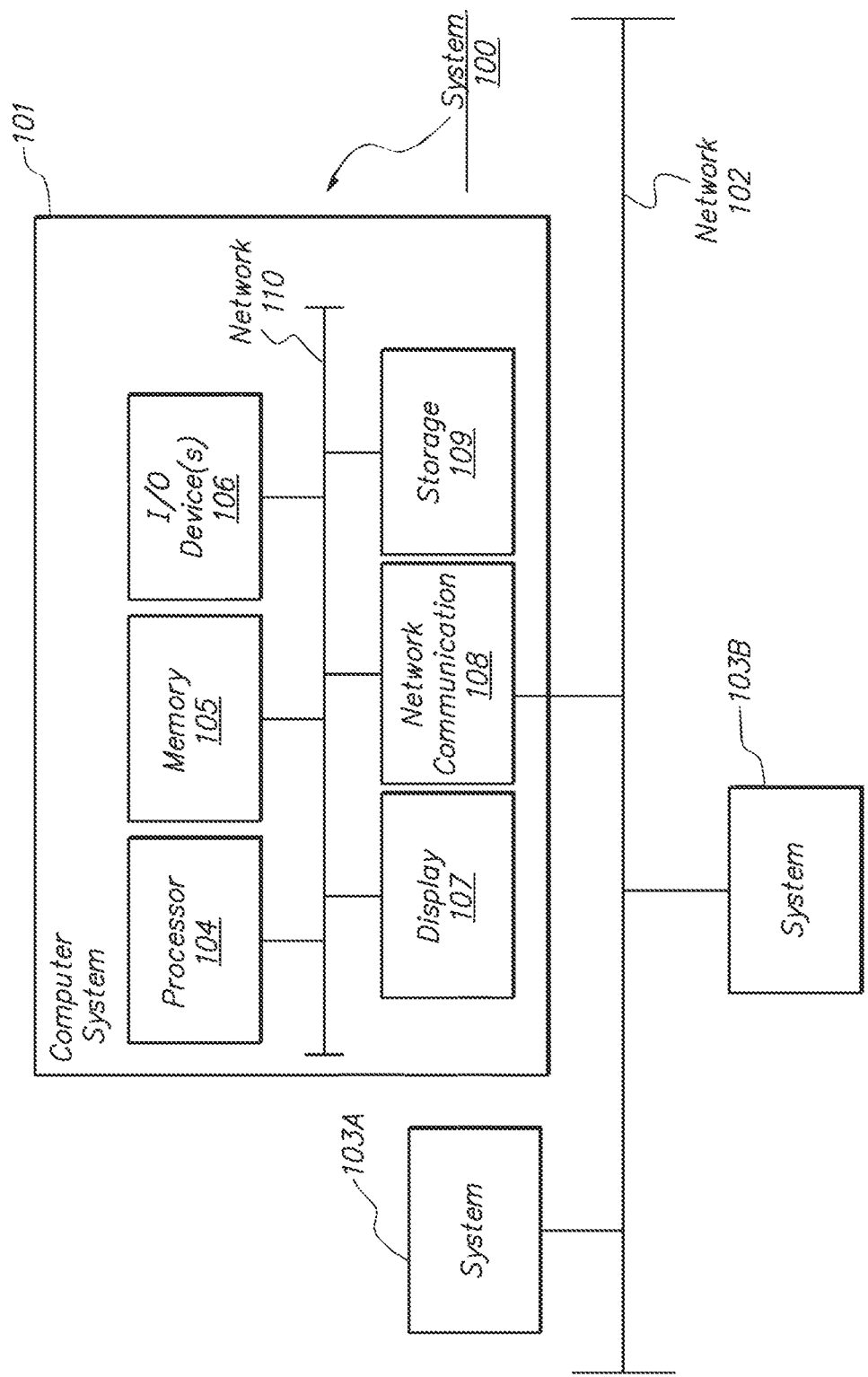
FIG. 1 depicts an example computer system upon which various aspects of the present invention may be implemented.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, one embodiment relates to classifying data in a computer system. According to one embodiment, it may be desirable to permit the use of classification information that can be interpreted by a computer system. To this end, a system and method may be provided for creating classification information that may be interpreted by a computer system. Such classification information may be associated with content, and permit a computer system to process the content based on the classification information.

In one example, classification information may be associated by a user, system, or process with a portion of content, and a computer system processes the content based on the classification information. For instance, the computer system may be programmed to display information to a user in a particular way, cause the computer to handle the classification information differently, etc., depending, at least in part, on the classification data. For instance, the classification data may include tags, organizational structures, or other type of classification information.

As discussed, classification information may be in the form of one or more "tags." According to one embodiment, these tags may have a structured format to permit a computer system to interpret them. In one implementation, such tags may have more than one part. For instance, a multipart tag may be defined that includes information that specifies a parameter that may be interpreted by a computer, along with one or more values of that parameter.

In one implementation, the structured format may be read by a computer system, and in response, cause the computer system to perform one or more actions in relation to the classified content. In one specific example, a particular portion of content may have classification information that specifies a location of the content or relevance to a particular location. A computer system that inspects such content may be capable of performing one or more actions on the content (e.g., modifying a display of the content, ordering an output of content, etc.) based on the location classification information. In one particular example, the computer system may present a geographical view of the content that is presented to a user in a user interface (UI).

Classification information may include other types of information, such as, for example, classification information relating to time. In one specific example, content may have associated classification information that identifies when the content was created, modified, or otherwise related to a time occurrence or time period. Because classification information, in one example, may be used among more than one application, system or platform, content may be shared between such entities. Classification information such as, for example, time, location, etc. may also be shared between entities so that content may be handled in a more efficient manner.

For instance, in the case where the classification information includes time information, a computer system interpreting the content may be capable of presenting a UI to a user that interprets the time information to generate a view of the content. For example, an application program executing on the computer may present a view of the content based on the time information. In one example, a calendar view may be presented that depicts content elements (or representations thereof) within the calendar interface. Content elements tagged with date and time tags could be turned into a calendar in the UI. In another example, the content may be presented in the well-known iCal format via an API or RSS. Thus, a user may be permitted to tag items within a social bookmarking application that would permit the items to be handled differently by the computer system and its applications.

Other applications include, for instance, a locational view of content based on location classification information. Thus, content can be presented to a user differently based on location information. In one example, a browser or other program (e.g., a social bookmarking application) may be adapted to evaluate the location information. Thus, it may be possible to find content elements that are geographically near a given point or near other content elements.

Other methods of tagging data may permit content to be handled in other ways. For instance, in the case of media files (e.g., MP3, MP4, AVI, MPG, etc. type files), such files (or links to such files) may be tagged with information indicating the type of media file, and/or other information that may indicate how the file content should be processed. For instance, a computer system may be configured to recognize and tag MP3 media objects. A computer system application (e.g., a browser and/or social bookmarking application) may be adapted to recognize such tag information (e.g., type: MP3), and perform an action with respect to processing the object or its representation. For instance, a collection of MP3 media objects may be transformed into a podcast via RSS, and presented to the user in the interface as a podcast. In another example, MP3 (or other media object) may be displayed in an interface differently depending on the media type indicated by the tag information. For example, a control may be displayed next to a representation of a media object whose classification is an MP3 file, and selection of the control (e.g., a button) by the user may cause the media object to be loaded into an MP3 player application (e.g., the Windows Media Player application program).

Other types of tags may be used to cause a computer system to perform other functions. For instance, a tag of "for:<email address>" may, when entered by a user, cause a classification system or other application to send a copy of the content (or link thereto) to a user as indicated by the email address information. The tag may also be used to determine how the content is processed by an application, and the content may be processed differently depending on information associated with the tag. Notably, tags may be used to unify how content is handled across users, computer systems, operating systems and their applications.

Another aspect of the present invention relates to a process for creating user classifications. More specifically, a distributed process for creating classification data is provided that allows a user to create classifications of content that may be shared among systems, applications and users. Generally, there are many ways that users can classify data. However, classifications of data are generally limited to a specific user, applications and/or systems. For instance, e-mail items in the well-known Microsoft Outlook application program are restricted to the folders created within the application. Thus, a user could not use the same folder to organize items other than those types available within the Outlook application program.

According to one embodiment, it is realized that there are restrictions to using classification structures across domains, such as users, systems, and applications. According to one specific aspect of the present invention, a system is provided wherein classification structures can be shared among data objects (e.g., those that contain content) in an open manner. To this end, a distributed system is provided for sharing classifications and references to content.

According to one embodiment, classification structures such as tags may be shared and interpreted by a computer system and its applications. In particular, the computer and its associated software may process content according to the classification information. In one example, classification information may be associated by a user, system, or process with a portion of content, and the distributed computer processes the content based on the classification information.

Further, the distributed system may be adapted to display, for example, reference information such as Uniform Resource Locator (URL) information. Such reference information may refer, for example, to a website page referenced by a URL address. In one embodiment, the system is capable of storing one or more user classifications associated with content referenced by the URL. The classification information may be, according to one embodiment of the present invention, tag information including one or more keywords that describe the referenced content.

A tag may itself have more than one keyword associated with it (e.g., a multiple word tag). Such tags using multiple elements may include, for example, one or more keywords presented in a particular format. In one example using a multiple word tag, keywords may be separated by one or more spaces (e.g., "household pet"), other types of characters (e.g., "books:fiction"), or no character (e.g., "newyorkyankees"). It should be appreciated that tags may have any type of formatting, and the invention is not limited to single-word tags.

Such tag information may be collected in a distributed manner from multiple users. Users may also be permitted to view tags used by other users to classify a particular page, and to use other's classifications for classifying content. To this end, the system may present to a user a listing of classifications used by other users to classify currently-viewed content.

The system may include, in one specific example, a system for managing bookmarks in a browser program executing on a local computer system. Such bookmark manager programs are well-known, and are used to organize URL information. Examples include the del.icio.us bookmarking system and Internet service, available at http://del.icio.us, the Spurl.net bookmarking system and service available at http://www.spurl.net, among others. According to one embodiment, a distributed bookmark manager that collects tag information from multiple users is used to determine classification information that determines how the content is processed by a computer system (e.g., as referenced by URL data). Optionally, the distributed bookmark manager or other program may create classification information and associate such information with referenced content.

In one such bookmark management system, a bookmark management program is executed by a user's browser program. The bookmark management program performs functions relating to storing and classifying URL information based on input from the user. For example, the bookmark management program permits the user to associate a currently-viewed URL with one or more keywords or "tags."

In one such bookmark manager program, URLs classified by the user are stored in a database located on a network (e.g., stored centrally on a network server or distributed among a number of systems in a distributed database). In this way, the user may access his/her bookmarks from one or more systems or locations. Further, because bookmark information is located on a server, such information may be shared with other systems and/or users. For example, bookmark information may be shared among a plurality of users, the users operating a client system. The users may, for example, use a browser program (e.g., the Microsoft Internet Explorer browser program or other type of browser program) to access a bookmark service to classify information. Users may, alternatively or in addition to accessing bookmark information through a browser program, access bookmark information through one or more application programs and/or operating systems.

According to various aspects of the present invention, a server-based system may collect classification from one or more client types. In one example, the client system may be a browser-based system that permits the user to classify content and provide classification data to the server-based system in real time. However, the server-based system may collect classification information from other types of clients (e.g., thick or thin clients, different types of client systems (cell phones, PDAs, web servers, etc.), different types of programs (OSs, programs, etc.). These other types of clients may provide such classification in real time, may provide information periodically, or may provide information at defined times (e.g., when a specific action is taken on the client). In this way, the server system is capable of collecting and distributing classification information to a variety of client and system types.

According to one embodiment of the present invention, such tag information is collected by a collaborative system that collects tag information from multiple users. The system may include a number of features to facilitate users' classifications, such as, for example, displaying classifications from other users for the same content. This feature may permit, for example, the user to refine their own use of tags, or use additional tags for classifying a particular content reference (e.g., URL). Further, the system may show, to the user, URLs associated with the same or related tag information. This feature may allow the user to locate related content previously located and classified by other users. Other features may include a listing of most recently bookmarked URLs, most frequently bookmarked URLs, and a subscription feature that allows a user to subscribe to other's bookmarks having similar interests.

The system may also be capable of providing any or all of the bookmark information to other programs via, for example, an RSS feed, API, or other programming mechanism. The interface to the system may permit, for example, the user and/or applications to store, edit, categorize, and retrieve bookmark information. Thus, application developers may extend the functions of applications including, but not limited to, browsers, desktop client programs, and API bindings for various programming languages. The system may store the information in one or more databases (e.g., object, relational, or other database type). Alternatively, or in addition to traditional databases, information may be stored in any other database format such as flat-file or other data structure file format (e.g., XML).

In this way, user classifications may be collected and provided to website owners or other entities for determining ad placement. Such classification information may be sold to entities that provide Internet services, such as, for example, ad services and/or Internet search services. Further, such classification information may be used to locate Internet resources in place of or along with conventional Internet search utilities.

As discussed above, advertisers using the collaborative system may allow the advertiser to associate particular classifications to content provided by the advertiser. This may permit, for example, the advertiser to publish their own classifications to the collaborative system, and those published classifications may be used by users of the collaborative system. In particular, the users may use the classifications, such as tags or any other organizational structure, to locate the content provided by the advertiser.

In one aspect of the invention, the advertiser may compensate an operator of the collaborative system (e.g., a social bookmarking system) when the advertiser's content is located using the system. In this way, the advertiser may control which associations are made with their content and may share such classifications with other users so that their content can be located. To this end, the collaborative system may include one or more interface elements that permit an advertiser to publish classification information associated with their content. According to one embodiment, a user acting on behalf of the organization (the advertiser) may log into the collaborative system as a user, and create, delete, and modify classifications attributed to the organization. Such classifications may be shared with other users.

General Purpose Computer System

Various embodiments according to the present invention may be implemented on one or more computer systems. These computer systems may be, for example, general-purpose computers such as those based on Intel PENTIUM-type processor, Motorola PowerPC, AMD Athlon or Turion, Sun UltraSPARC, Hewlett-Packard PA-RISC processors, or any other type of processor. It should be appreciated that one or more of any type of computer system may be used to determine ad placement according to various embodiments of the invention. Further, the system may be located on a single computer or may be distributed among a plurality of computers attached by a communications network.

A general-purpose computer system according to one embodiment is configured to perform any of the described functions, including but not limited to, storing, editing, categorizing, and retrieving bookmark information. It should be appreciated that the system may perform other functions, including storing and/or managing bookmark information, sharing bookmark information, etc., and the invention is not limited to having any particular function or set of functions.

FIG. 1 depicts a block diagram of a general-purpose computer and network system 100 in which various aspects of the present invention may be practiced. For example, various aspects of the invention may be implemented as specialized software executing in one or more computer systems including general-purpose computer system 101 shown in FIG. 1. Computer system 101 may include a processor 104 connected to one or more memory devices 105, such as a disk drive, memory, or other device for storing data. Memory 105 is typically used for storing programs and data during operation of the computer system 101. Components of computer system 101 may be coupled by an interconnection mechanism such as network 110, which may include one or more busses (e.g., between components that are integrated within a same machine) and/or a network (e.g., between components that reside on separate discrete machines). The interconnection mechanism enables communications (e.g., data, instructions) to be exchanged between system components of system 101.

Computer system 101 also includes one or more input/output (110) devices 106, for example, a keyboard, mouse, trackball, microphone, touch screen, a printing device, display screen, speaker, etc. In addition, computer system 101 may contain one or more interfaces (e.g., network communication device 108) that connect computer system 101 to a communication network (in addition or as an alternative to the network 110).

The storage system 109 typically includes a computer readable and writeable nonvolatile recording medium in which signals are stored that define a program to be executed by the processor or information stored on or in the medium to be processed by the program. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). The memory may be located in storage system 109, as shown, or in memory system 105. The processor 104 generally manipulates the data within the integrated circuit memory, and then copies the data to the medium associated with storage 109 after processing is completed. A variety of mechanisms are known for managing data movement between the medium and integrated circuit memory element and the invention is not limited thereto. The invention is not limited to a particular memory system or storage system.

The computer system may include specially programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 101 is shown by way of example as one type of computer system upon which various aspects of the invention may be practiced, it should be appreciated that aspects of the invention are not limited to being implemented on the computer system as shown in FIG. 1. Various aspects of the invention may be practiced on one or more computers having a different architectures or components that that shown in FIG. 1.

Computer system 101 may be a general-purpose computer system that is programmable using a high-level computer programming language. Computer system 101 may be also implemented using specially programmed, special-purpose hardware. In computer system 101, processor 104 is typically a commercially available processor, such as the well-known Pentium class processor, available from the Intel Corporation. Many other processors are available. Such a processor usually executes an operating system which may be, for example, the Windows-based operating systems (e.g., Windows NT, Windows 2000 (Windows ME), Windows XP operating systems) available from the Microsoft Corporation, MAC OS System X operating system available from Apple, Inc., one or more of the Linux-based operating system distributions (e.g., the Enterprise Linux operating system available from Red Hat Inc.), the Solaris operating system available from Sun Microsystems, or UNIX operating systems available from various sources. Many other operating systems may be used, and the invention is not limited to any particular operating system.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Various aspects of this system can be implemented by one or more systems within system 100. For instance, the system may be a distributed system (e.g., client server, multi-tier system). In one example, the system includes software processes executing on a system associated with a user (e.g., a client system). These systems may permit the user to associate classification information with one or more references to content (e.g., a URL).

Example System Architecture

Figure 2:
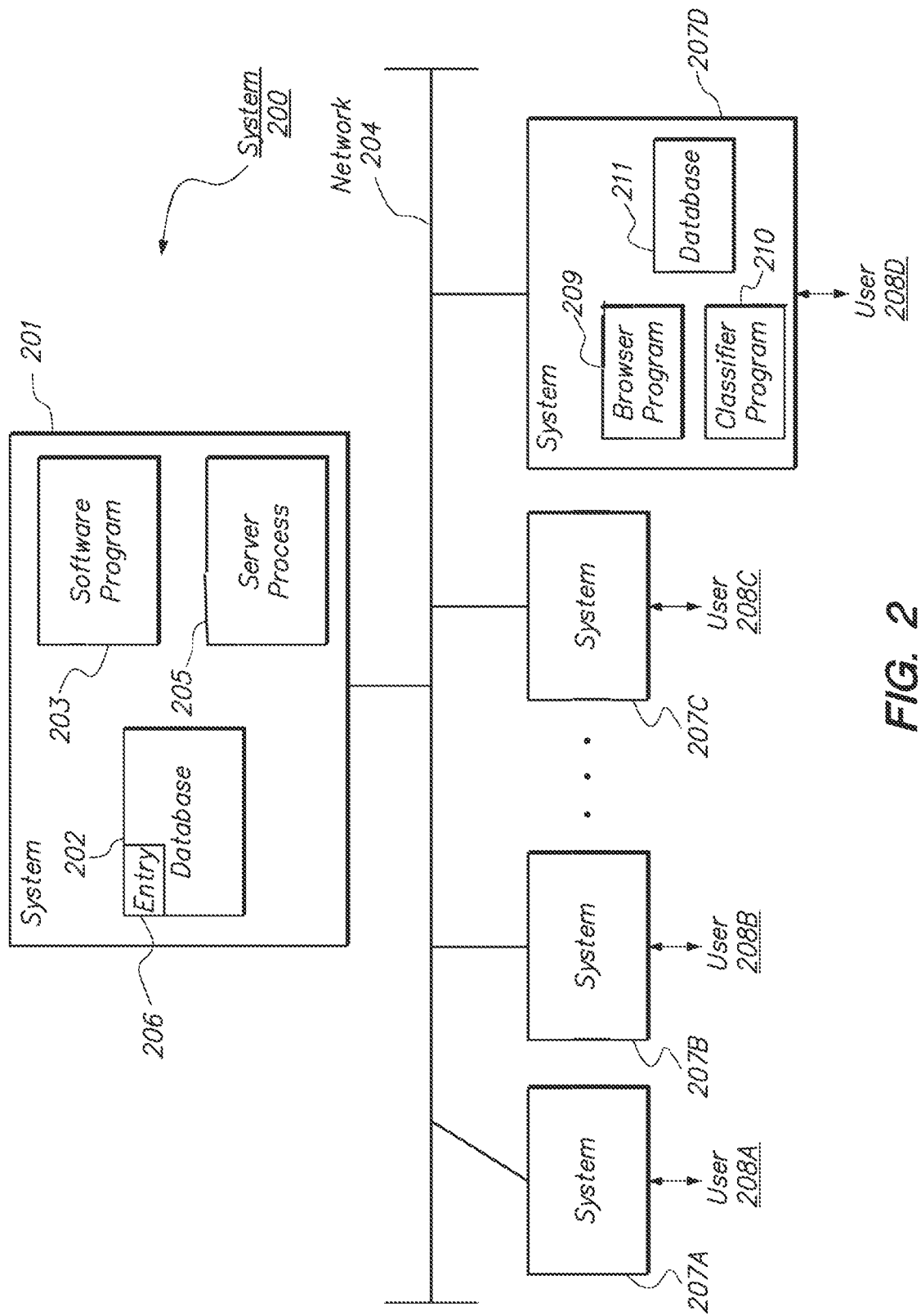
FIG. 2 depicts an example system architecture according to one embodiment of the present invention.

FIG. 2 depicts an architecture diagram of an example system according to one embodiment of the invention. It should be appreciated that FIG. 2 is used for illustration purposes only, and that other architectures may be used to facilitate one or more aspects of the present invention.

As shown in FIG. 2, a distributed system 200 may be used to create and store user classification information. System 200 may include one or more computer systems (e.g., systems 201, 207A-D) coupled by a communication network 204. Such computer systems may be, for example, general-purpose computer systems as discussed above with reference to FIG. 1.

In one embodiment of the present invention, system 201 stores classification information in the form of tag information in one or more databases (e.g., database 202). Further, system 201 performs associated functions with the tag information.

System 201 may include a server process (e.g., process 205) that responds to requests from one or more client programs. Process 205 may include, for example, an HTTP server or other server-based process (e.g., a database server process, XML server, peer-to-peer process) that interfaces to one or more client programs distributed among one or more client systems (e.g., systems 207A-207D).

According to one embodiment, client programs may be capable of permitting a user to classify content. Such programs may include, for example, any type of operating system and/or application program capable of communicating with system 201 through network 204. In one particular instance, a client may include a browser program (e.g., browser program 209) that communicates with server process 205 using one or more communication protocols (e.g., HTTP over a TCP/IP-based network, XML requests using HTTP through an Ajax client process, distributed objects, etc.).

Although it is shown by way of example that a browser program may be used to classify data, it should be appreciated that other programs may be used to interface a user to server process 205. For instance, an application program that is specially developed to manage classification data may be provided to permit a user to perform classifications according to one embodiment of the present invention. The client program may be, for example, a thin client including an interface for managing classification data, although such classification data may or may not be stored on the client. Alternatively, the client may be a scripted program, or any other type of program having the capability of transferring classification data. According to one embodiment, such client programs may, for example, be downloaded and installed over the network. Further, these client programs may be stored and distributed by system 201 in the form of one or more software programs 203.

In one specific example, the client program may include a classifier program 210 that permits the user to associate classification data with one or more references to content (e.g., URLs). This classifier program 210, in one embodiment, may be integrated with browser program 209 executing on system 207D. For instance, the classifier program 210 may include one or more controls that, when selected by the user, perform storing, editing, and other functions of tag information. These controls may be written in a variety of programming languages, and the invention is not limited to any particular language. In one specific example, the control may be a bookmark that, when accessed, performs one or more programmed functions.

In one embodiment, the controls may be displayed as selections in the user's bookmark list. When selected, one type of control may permit the user to associate tag information with the currently-viewed URL. In another type of control, the user may be permitted to view a list of tags previously associated with the user. To this end, the user may be presented a web page that includes defined tags and their associated URL data. Yet another type of control may permit the user to see tags defined by others. In particular, the system may permit a user to see what other users have bookmarked a specific URL. Further, the capability may be provided for a user to view URLs collected by others, and subscribe to the links of users whose lists of URLs are interesting to the user. Additional capabilities may be provided to permit the user to organize Internet information and to benefit by other's previous organization of content.

Information stored in the database 202 may include, for example, a URL address, one or more keywords associated with the URL address, a description of the URL, among other information that may be used to describe and classify content. This information may be collected from the user in an interface (e.g., as described below with reference to FIG. 4) and stored in the database (e.g., database 202). Additionally, client systems may store a local copy of a user's tag information with a local database associated with the client system (e.g., database 211 located on client system 207D). However, it should be appreciated that the invention is not limited to storing classification information in any particular location.

A client system (e.g., systems 207A-207D) may include one or more interfaces through which advertisements may be presented to the user. In one example, advertisements may be presented in an interface of a browser program (e.g., browser program 209) executing on a client computer system. As discussed, one embodiment relates to receiving inputs through an application (e.g., a social bookmarking system) and using such inputs to determine ads displayed to a user (e.g., users 208A-208D). Such ads may be displayed, for instance in an interface associated with a social bookmarking application program.

Figures 3A, 3B:
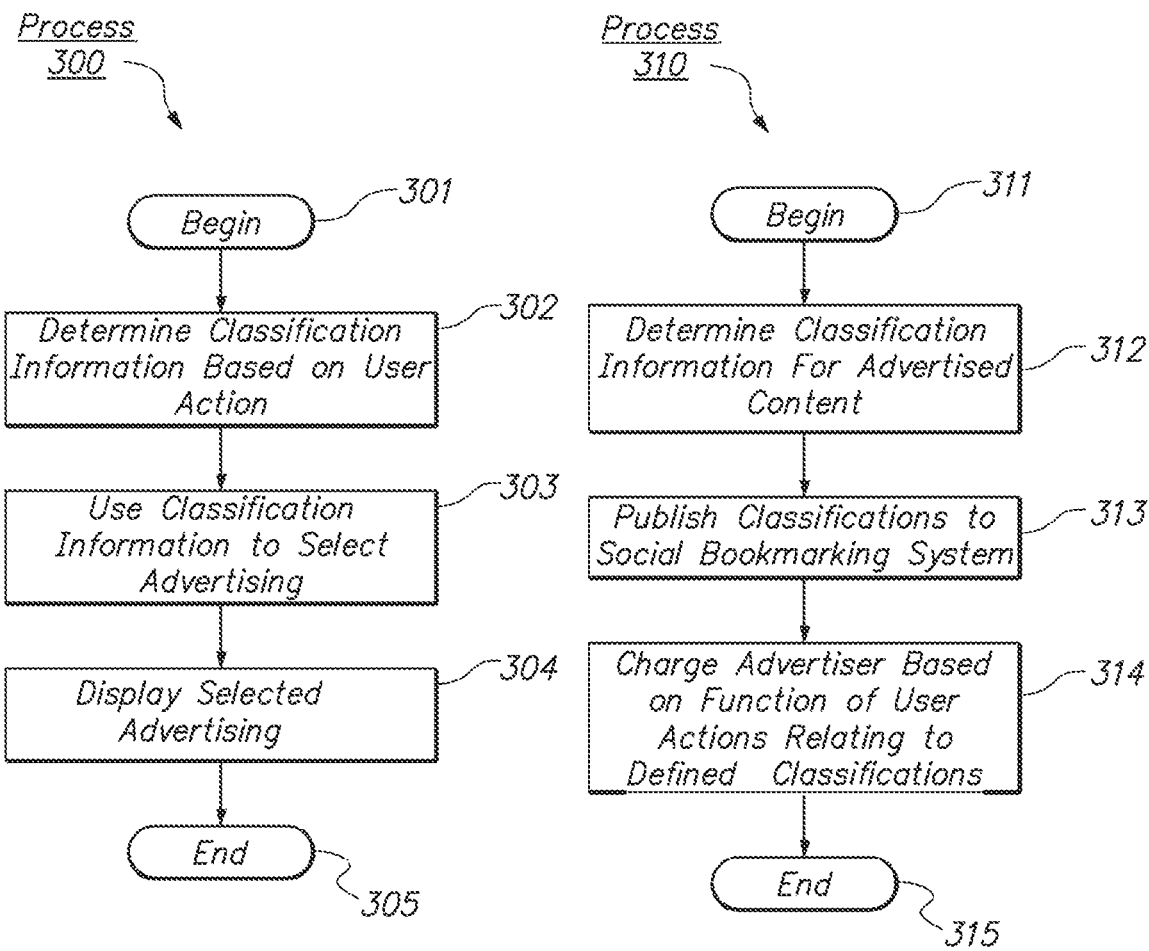
FIG. 3A depicts an example process for creating classification data according to one embodiment of the present invention.
FIG. 3B depicts an example process for publishing classification data according to one embodiment of the present invention.

FIG. 3A depicts a general process 300 for creating classification data according to one embodiment of the present invention. At block 301, process 300 begins. In one example system, a user may be capable of providing classification data that classifies one or more portions of content. Such a user may be an individual that uses a system (e.g., system 200) to make, use and store classification information. In another embodiment, the user may represent an organization, permitting that user to provide classification information on behalf of the organization. Thus, the organization may be permitted to publish classification information associated with their content.

At block 302, a computer system (e.g., a client computer, server computer or other computer or process) determines classification data based on a user action. For instance, the user may associate one or more tags with content, place a portion of content in a particular folder, or any other user action that may be used to create a classification.

Further, a computer system may store the classification. The classification data may be stored locally at a computer system operated by the user, and/or may be stored centrally at a server. In one embodiment, classification data may be stored for each user over time. Such advertising may be ads that are available to be displayed to a particular user, and selected for individual users based on the stored classifications.

At block 303, the classification data is used to select advertising to be displayed to a user. For instance, the advertising may be displayed to the user in a current computer session (in the same or different application interface) based on the classification provided. Further, advertising may be selected based on stored classification information for the user. In one specific example, classifications collected over time may be used by the system (e.g., a social bookmarking system) to determine ads to be displayed to the user. For instance, for a particular portion of content (e.g., one referenced by a URL), one or more of the most frequently-occurring keywords associated with a particular URL may be used as classification information to determine selected advertising. In one specific example, such keywords may be used as inputs to an ad-matching program, such as AdSense, to determine advertising selected for display to the user.

At block 304, the selected ads may be displayed to the user. Such display may occur, for example, on a display associated with the same or a different computer system. Further, the selected ads may be displayed in a presently-occurring or future computer session. At block 305, process 300 ends.

FIG. 3B depicts a general process 310 for publishing classification data according to one embodiment of the present invention. At block 311, process 310 begins. In one example system, a user representing an advertiser is permitted to provide classification information on behalf of an organization. In particular, the user may provide one or more tags to be associated with content. At block 312, the user determines classification information for the advertised content. Such classifications may include, for example, tags or any other classification information that the organization would like associated with the particular content.

At block 313, the user, on behalf of the organization, is permitted to publish the classification information to a social bookmarking system. As discussed, the social bookmarking system may permit access to previously-defined classifications associated with a user. According to one embodiment, the social bookmarking system is modified to allow the publication and sharing of classifications originating from organizations.

According to one embodiment, the organization may use classification information to classifications created by users that refer to their content. In one specific example, advertisers may subscribe to particular tags or other classification information that reference their content. Rather than provide their own recommendations regarding classifications of their content, the organization may use classifications provided by users as indications of the "meaning" that should be attributed to the advertiser's content. In this way, the meaning attributed by users may prove to be a more effective determinant of advertising than conventional targeting techniques originated solely by advertisers. More particularly, the meaning of content as attributed by users may be a more accurate input for determining ads to be displayed to such users than a selection of an association between ads and content as performed by an advertiser. For instance, if a classification provided by a user for a restaurant in Miami is associated by a user with keywords "vacation" or "travel", the advertiser may choose to subscribe to such keywords or combinations thereof rather than (or in addition to) some other advertiser-generated classification.

In one specific embodiment, the classification information relates to content provided by the organization. Such information may be provided, for example, by a user representing the organization and providing classification information on their behalf. Other methods (e.g., linking to a list of classifications, providing classification data through an API of the social bookmarking system, etc.) may be used for transferring classification data to the social bookmarking system.

At block 314, an operator of the social bookmarking system is permitted to charge an advertiser based on a function of user actions relating to the defined classifications. In one specific example, a user selects a classification defined by an organization that originates the content associated with the classification. Once selected, the organization (the advertiser) may be charged a fee. Fees may be charged, for example, when a user selects content through advertiser-based classifications, selection of particular advertisements displayed within the social bookmarking application, and/or when a user completes an action (e.g., a purchase) with the referenced content. At block 315, process 310 ends.

Figure 3C:
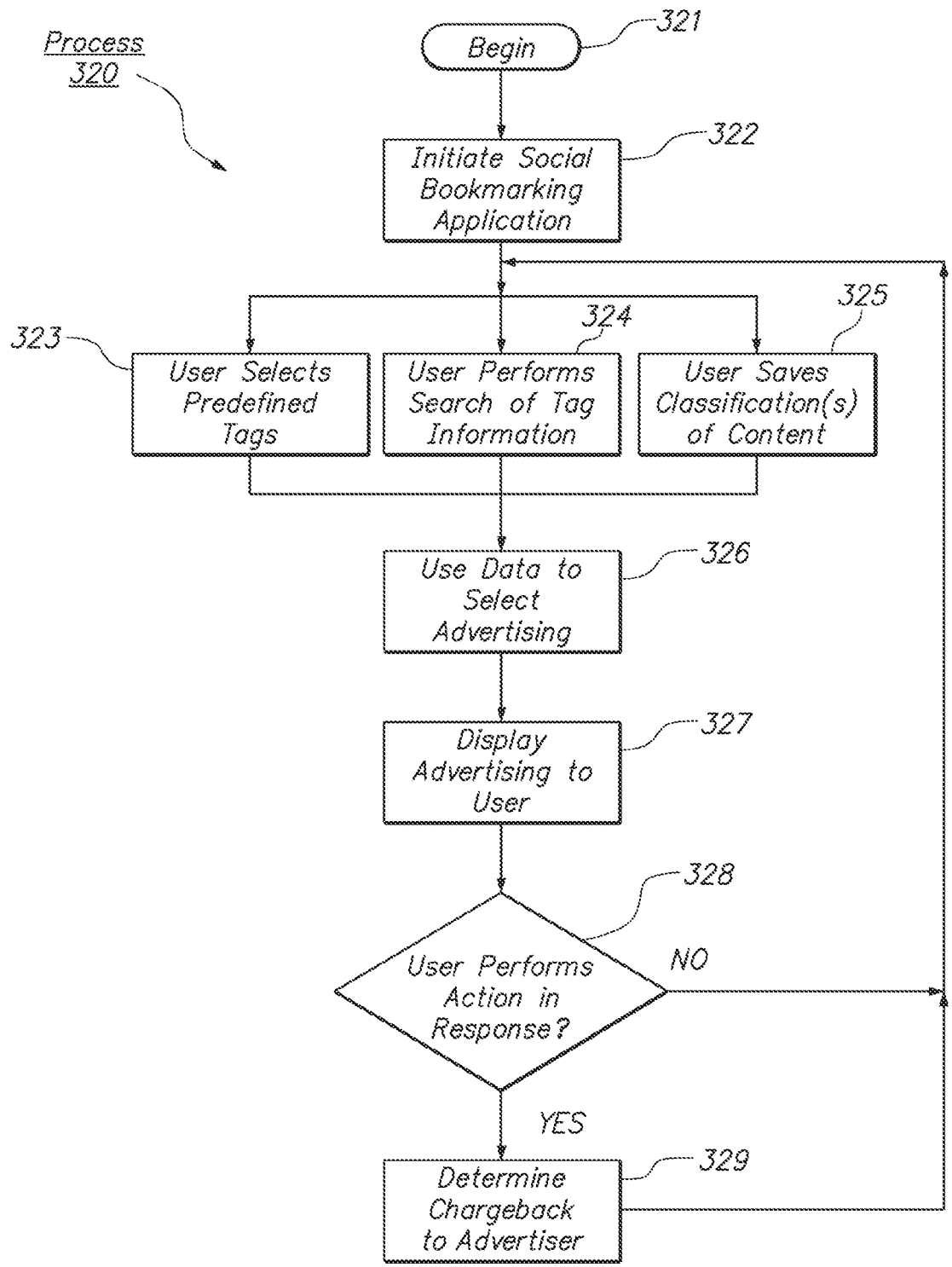
FIG. 3C depicts an example process for displaying advertisements in a social bookmarking application according to one embodiment of the present invention.

FIG. 3C depicts an example process for displaying advertisements in a social bookmarking application according to one embodiment of the present invention. At block 321, process 320 begins. At block 322, a user initiates a social bookmarking application. As discussed, such an application may include any application, which may be used to organize and associate classification information with references to content (e.g., URLs). Such applications may be application programs installed and initiated on a computer, may be associated with a browser application program, or may be a combination of an installed and an Internet-based application.

According to one embodiment, ad placement may be determined by one or more actions performed by a user and/or information provided by the user to a social bookmarking system. For instance, at block 323, a user may be permitted to select one or more predefined tags displayed to the user within a user interface of the social bookmarking application. Such predefined tags may be, for example, tags defined by other users, tags defined by the particular user in a listing of personal tags, or other type of classification information (e.g., a folder that contains a reference to content).

Another action may include, for example, performing a search by the user of tag information at block 324. More particularly, the user may enter tag information in a search field of an interface of the social bookmarking application and perform a search based on the entered tag information. In one embodiment, the social bookmarking application maintains a database of tags defined by users of the application, and users are permitted to search based on tag information. Also, the user may be permitted to search on other related information, such as a description attributed to the reference to content, title of the reference, title of the content, metadata associated with the referenced content, portions of the content itself, and/or any other associated information.

In another example, a user, at block 325, saves one or more classifications of content in the social bookmarking application. This may be done, for example, by associating one or more tags with a reference to content (e.g., a URL).

One method of associating classification information with content is discussed below with respect to FIG. 5.

At block 326, the social bookmarking application may be adapted to select advertising based on one or more actions performed by the user (e.g., actions performed at blocks 323-325). In one example, when a user selects a predefined tag at block 323, advertising associated with the selected tag may be displayed to the user (at block 327). In this example, the advertising may be displayed shortly after the user selects the predefined tag. In yet another example, the advertising may be displayed at some point after the user performs the selection.

In another example, as the user performs a search of tag information in the social bookmarking system, advertisements may be displayed to the user based on the search parameters and/or results associated with the search. For instance, one or more keywords entered in a search field may be used as inputs to an ad determining program. In another example, keywords associated with tags defined in the system corresponding to keywords entered in the search field may be used to locate an ad displayed to a user.

In yet another example, ads displayed to the user may be selected based on classification information associated with that user (e.g., by the user saving classifications at block 325). Thus, the user's behavior may be monitored by the social bookmarking application to determine what advertisements are displayed to a user. Which advertisements are displayed may be based at least in part on the user's use of such classifications, how many content elements are associated with a particular classification, when such a classification was previously accessed, or other behavioral item associated with a particular classification.

According to one embodiment, the operator of the social bookmarking application may be compensated for actions performed in response to the display of the advertisements. In particular, at block 328 it is determined whether a user performs an action in response to the display of the advertisement. In one example, the user may perform a purchase based on the displayed advertisement, or may take any other action with respect to the displayed content. If the user does not perform an action, the social bookmarking application continues to accept further inputs to the user. However, if it is determined that the user performs an appropriate action, a charge back to the advertiser may be determined at block 329. In this way, the operator of the social bookmarking application may be compensated for referrals provided by the system.

Figures 4A, 4B:
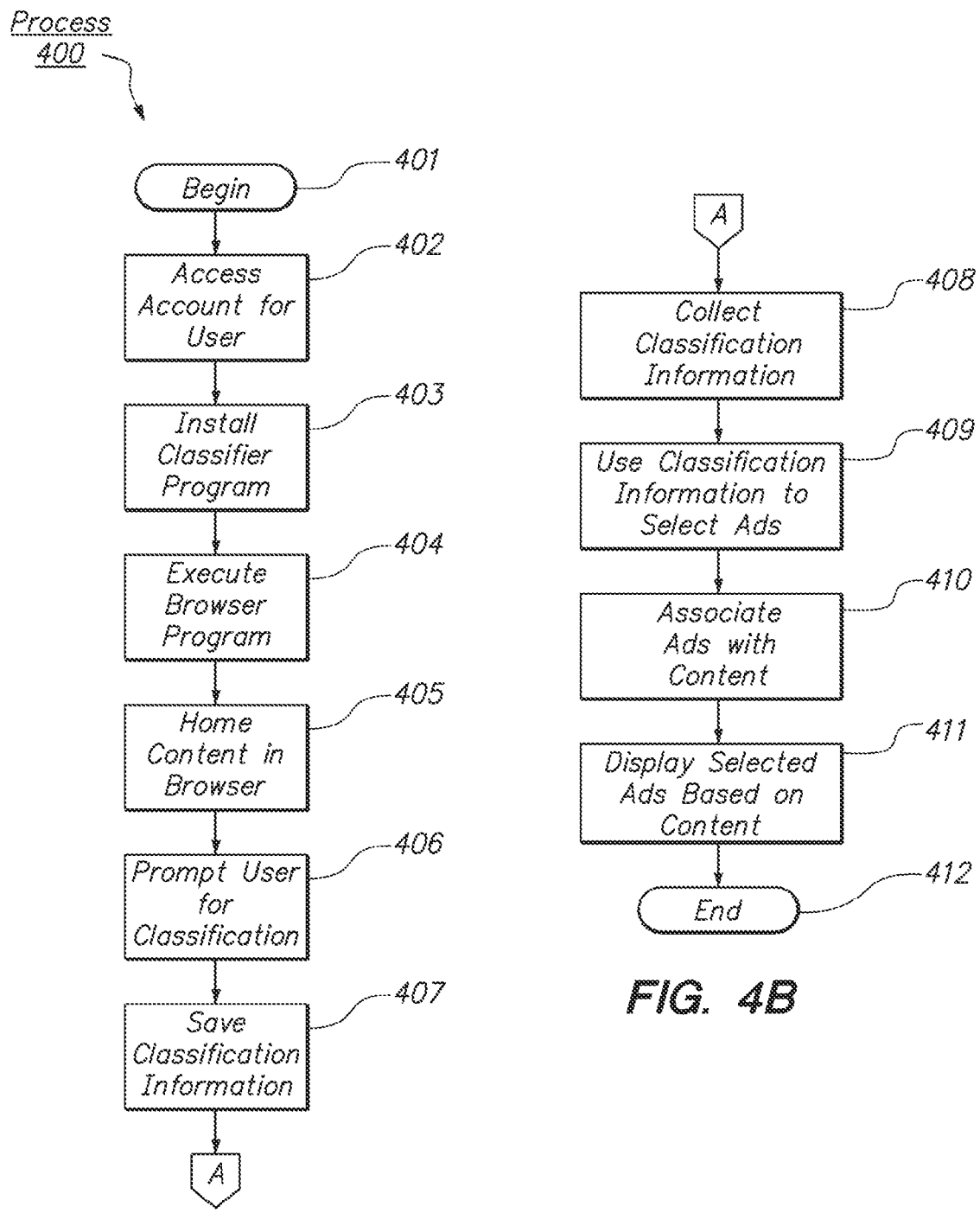
FIGS. 4A-4B depict an example process for creating classification data according to one embodiment of the present invention.

FIGS. 4A-4B depict an example process 400 for creating classification (e.g., tag) data according to one embodiment of the present invention. At block 401, process 400 begins. In one example system (e.g., system 200 discussed above with reference to FIG. 2), a user may have an associated user account with which tag information is associated. This account may permit, for example, the user to access tag information from multiple systems, to share tag information with other users, and other functions.

At block 402, the user accesses his/her account. Access may be performed, for example, by the user entering a login identifier (e.g., a user name) and password. Optionally, it is determined whether the user has an associated account, and if not, the user may be permitted to create an account to manage his/her tag information. If, for example, the system on which the user is operating does not have an associated client program installed, the system may install any necessary software (e.g., classifier program 210) at block 403. The software may be programmed in any language or combination of languages, and the invention is not limited to any particular language or set of languages.

As discussed above, the client program may be integrated with a browser program (e.g., browser program 209) installed on the client system (e.g., system 207D). At block 405, the user loads content into a browser program interface by, for example, by entering a specific URL in an address line of the browser interface, or by selecting a link to the URL from another URL reference (e.g., a search function).

The user may select to classify the currently-viewed URL by, for example, selecting a control within an interface of the browser. In response to selecting the control, the program may prompt the user at block 406 to classify the content. The prompting may be displayed, for example, in a same or different window of the browser interface that displays the selected content. Specifically, the interface may prompt the user to enter one or more tags associated with the URL. These tags may be, according to one embodiment, keywords that describe the content referenced by the URL.

At block 407, the system saves the collected classification information. As discussed, the information may be stored in a database of a server coupled to the client over a communication network. Classification information may also be stored local to the client (or in any other location) so that the information may be accessed by the client when not connected to the network, or when the information is accessed by other applications when not connected to the network.

At block 408, the classification information may be collected and maintained by the system over time. For instance, the system may maintain classification information received from individual users over time. This information may be consolidated and used as classification information to select advertising at block 409. For instance, for a particular URL, one or more of the most frequently-occurring keywords associated with a particular URL may be used as classification information to determine selected advertising. In one specific example, such keywords may be used as inputs to an ad-matching program such as AdSense.

Once selected, the ads may be associated with the URL described by the classification information (e.g., at block 410). The ads themselves may include data and/or programs that present advertisements to users. The ad content may be linked with, embedded in, or otherwise associated with the web page referenced by the URL. The ads may be displayed when the URL is subsequently loaded in a browser program (e.g., block 411). The URL may be subsequently loaded by the same or a different browser program instance (e.g., a browser program instance existing on another client system). In this manner, user-selected classifications of the content may be used to associate ads with the referenced content. At block 412, process 400 ends.

Although FIGS. 4A-4B discussed above depict a process that involves the creation of classifications using a browser program, it should be appreciated that classifications may be performed using any type of computer system and/or application, and the invention is not limited to any particular implementation. For example, the classification system may be implemented in an operating system and/or application, permitting users and/or programs to classify information, and any resulting classification information can be used to associate ads with content.

Figure 4C:
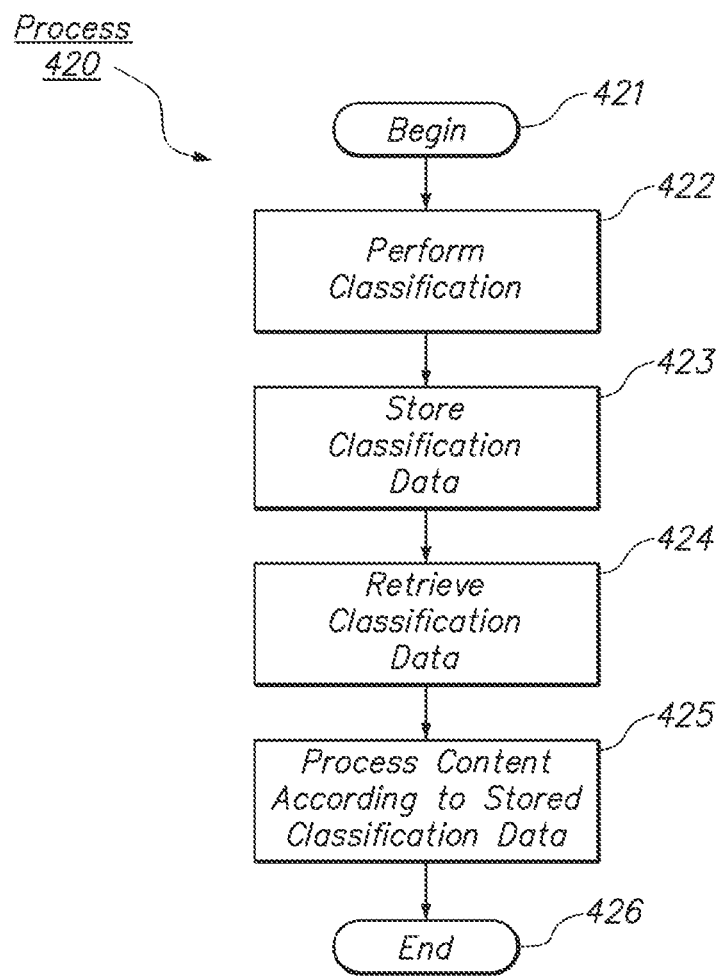
FIG. 4C depicts an example process for processing classification data according to one embodiment of the present invention.

FIG. 4C depicts an example process 420 for processing classification data, according to one embodiment of the present invention. At block 421, process 420 begins. As discussed above, content (or a portion thereof) may be classified (e.g., at block 422). For example, the content may be classified by a user, computer system, process, or combination thereof.

At some point in time, the classification data is stored (block 423) for some future use by one or more users, systems and/or processes. For instance, the classification data may be stored in a storage device of a server of a social bookmarking system. At some later time, the classification data may be retrieved (e.g., at block 424). For instance, a user may access saved classification data from a social bookmarking system. At block 425, the content (or portion thereof) may be processed using the stored classification data. For instance, an action may be performed with the content that is influenced by the classification data. In one example, the classification data may be used to determine how the content is displayed to a user (e.g., in a display of a computer system), how it is processed (e.g., sent in an e-mail to a user), or otherwise how the content is handled by a computer system in a distributed system. At block 426, process 420 ends.

Figure 4D:
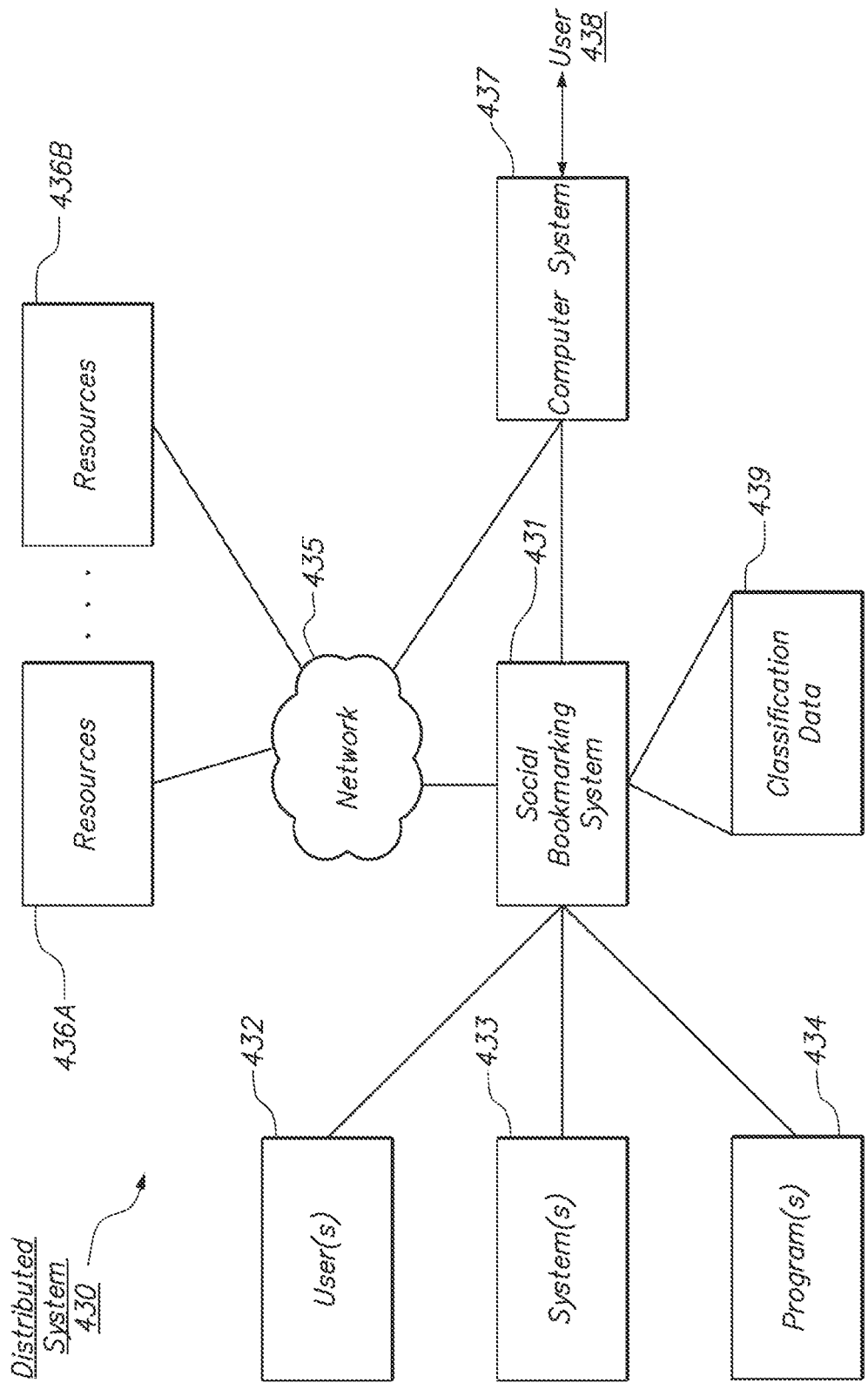
FIG. 4D depicts an example distributed system for classifying and processing data according to one embodiment of the present invention.

FIG. 4D depicts an example distributed system 430 for classifying and processing data, according to one embodiment of the present invention. As discussed, classification information may be associated by a user, system, or process with a portion of content, and a computer system processes the content based on the classification information. For instance, the classification information may cause content to be processed in a particular way, presented to a user by a particular application program, cause the content to be forwarded to a particular user, or otherwise influence how the content is handled.

As shown in FIG. 4D, the classification data may be generated by a user (e.g., by one or more users 432), and/or by a computer system (e.g., systems 433) or process (e.g., by executing one or more programs 434). For instance, the classification data may be generated by an analysis of the content by a process executing on a computer system. In one specific example, a file may be analyzed to determine its data type, and in response, classification data may be generated and associated with the file. In the case where a user generates classification data, the user may associate classification data in a conventional way (e.g., within a social bookmarking application of a social bookmarking system 431), however, the classification data may have a predetermined format that permits the classification data to be understood by a computer system.

According to one embodiment, the classification data may be stored as part of the content in a memory of the computer system. In another embodiment, the classification data may be stored by a social bookmarking system (e.g., system 431). For instance, classification data may be stored in one or more server-based systems and/or be distributed among one or more computers.

Content referenced by the classification information may be located on one or more resources 436A-B coupled to a computer system 437 in distributed system 430. Distributed system 430 may include one or more computer systems that access one or any number of resources. Such resources may include a website, file system, or other provider of content that can be classified. According to one embodiment, computer systems and their users (e.g., system 437 and user 438) access such content from resources 436A-B.

According to one embodiment of the present invention, computer systems and their users (e.g., system 437 and user 438) also use stored classification data 439 to determine how the content is processed. For instance, a user 438 using a browser program may retrieve certain content which is classified in a social bookmarking system, and classification data associated with the retrieved content is used to determine how the content is presented to the user. In one particular embodiment, the classification data is collected by social bookmarking system 431 from various entities (e.g., user(s) 432, system(s) 433, program(s) 434, etc.) and provides such classification data to content-processing systems.

Figure 4E:
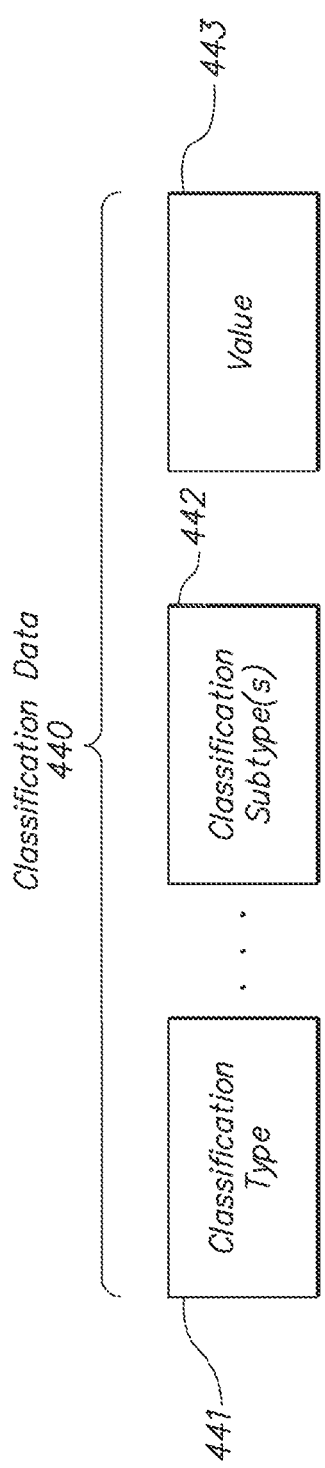
FIG. 4E depicts an example classification data structure according to one embodiment of the present invention.

FIG. 4E depicts an example classification data structure according to one embodiment of the present invention. For instance, classification data 440 may include one or more classification types 441 that specify the type of classification. For instance, a classification type may include, for instance classification type data, that when inspected by a computer system, indicates that the computer system should perform an action. Content (or a portion thereof) may include one or more classification types, which may be interpreted by a computer system, and one or more unstructured (or unrecognized) types of classification information. For instance, a classification type "system:" may be indicative of a classification created by a computer system. Further, when inspected, the "computer:" classification type may signal to a computer system that the content should be processed in a particular way. This method of providing a structured format for specifying classification type contrasts to conventional tagging types, where users are free to associate keyword and keyword combinations with content.

Optionally, the classification data may include one or more classification subtypes 442 that define subtypes of the overall classification type. Classification data 440 may also include one or more values 443 that specify an end value to be used with the classification type (and, optionally, subtype) to further specify how the content is processed. The following examples illustrate various aspects of classification types according to various embodiments of the present invention, each of which may be used alone or in combination with any other classification type.

Examples of the "system:" classification type may include classification of content by file type, media type, or any other system-related information needed to process the content. For instance, the following tags may be used:

A tag "system:media:audio" may be used to describe audio content, where "system:" is the classification type, "media:" is a subtype indicating the type of media, and "audio" is a value. A few examples include:

---
\*.mp3 files tagged as "system:filetype:mp3"
\*.wav files tagged as "system:filetype:wav"
A tag "system:media:video" may include:
\*.mpg files tagged as "system:filetype:mpg"
\*.mpeg files tagged as "system:filetype:mpeg"
\*.avi files tagged as "system:filetype:avi"
\*.wmv files tagged as "system:filetype:wmv"
\*.mov files tagged as "system:filetype:mov"
---

Further, such tags may be used by a social bookmarking system to determine how content is displayed to a user. For instance, in the case of the del.icio.us social bookmarking system, music items listed may be referenced as http://del.icio.us/tag/system:media:audio, mp3 files tagged as "mashups" may be referenced as http://del.icio.us/tag/system:filetype:mp3+mashups, and video items may be referenced as http://del.icio.us/tag/system:media:video, among others. In another example, music items listed on the del.icio.us system as a podcast may be referenced as http://del.icio.us/rss/tag/system:media:audio, mp3s tagged as mashups listed on the del.icio.us system as a podcast may be referenced as http://del.i cio.us/rss/tag/system: filetype: mp3+mashups, video items listed on the del.icio.us system as a podcast may be referenced as http://del.icio.us/rs s/tag/system: media: video.

In addition, the following types may be recognized: The tag "system:media:image" includes:

---
\*.jpg as "system:filetype:jpg"
\*.jpeg as "system:filetype:jpeg"
\*.gif as "system:filetype:gif"
\*.png as "system:filetype:png"
The tag "system:media:document" may include:
\*.pdf as "system:filetype:pdf"
\*.doc as "system:filetype:doc"
---

There are other possible tag classification types that may be interpreted by a computer system. For instance, a structured tag of "for:<usemame>", may, when interpreted by a computer system, may cause an item to be routed to another user. Other types of tags may include system:<status>, system:mediatype:<mediatype> tags, which permits a social bookmarking system to track the status and mediatype of an object. Examples of other structured tag formats include date:<date>, time:<time> to express time, age, or other time-based element of content, location:lat:<latitude>, location:long:<longitude> to express location of content or relevance to a location, among other structured types, that, when inspected by a computer system or process, causes the computer to perform some action.

In the del.icio.us social bookmarking system, users associate tags with URLs or other pieces of information. These tags allow users to classify the information. The del.icio.us social bookmarking system allows arbitrary words to be used as tags—these words have meaning only for the user. It may be desirable to have tags convey information that can be understood by a computer system. To accomplish this, the del.icio.us social bookmarking system may be modified to support structured tagging of content.

Structured tagging provides the del.icio.us social bookmarking system with significant additional capabilities. By permitting structured tags in addition to normal tags, a mix of unconstrained vocabulary (conventional user-based tags) with constrained vocabulary (e.g., for what follows the ":" symbol in a structured tag) is permitted. The vocabulary of structured tags can be constrained to specific values or formats (e.g., a latitude). Also, for browsing or search or other access, a social bookmarking system can "evaluate" values of one or more of the structured tags. For instance, location tags make it possible to find all items that are geographically near a given point or each other.

Further, in another example, API/RSS feeds to deliver or the UI to render information items differently depending on the value of structured tags. For instance, the system:mediatype tags may be used to turn a collection of MP3 files into a podcast via RSS. In another example, a collection of items tagged with date and time tags could be turned into a calendar in the UI or provided via API/RSS in the well-known iCal format. Bookmarked items that end in a number of file types may have associated with them (e.g., by a social bookmarking system) one or more structured tags that specify the type of file.

Figure 5:
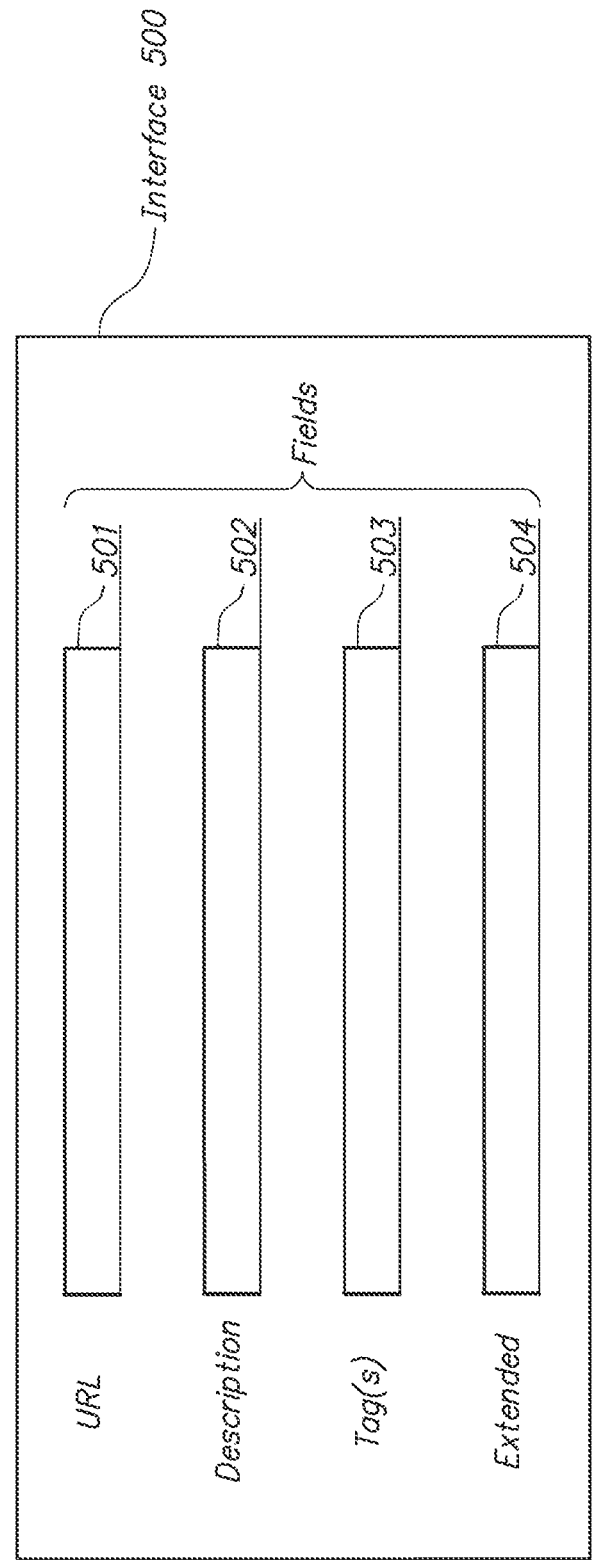
FIG. 5 depicts an example interface through which a user may enter classification information according to one embodiment of the present invention.

FIG. 5 depicts an example interface 500 in which classification information may be entered by a user into the system (e.g., system 200). Interface 500 may be presented to the user in a display of a computer system (e.g., a client system). Interface 500 may include, for example, an entry window having one or more fields (e.g., fields 501-504) in which data may be entered. The entry window may be the same or a different window used to display the content to be classified. In one specific example, the entry window may be shown in a browser interface or portion thereof. For instance, the entry window may be displayed in a frame of the browser interface.

As discussed above, the entry window may include one or more data entry fields in which classification information may be entered. In particular, the entry window may include a URL field 501 in which a URL address or other reference information may be entered. Interface 500 may also include a description field 502 that includes, for example, a text-based description of the URL content. By default, description 502 may include a stored title or filename of the content. Interface 500 may also include a tag field 503 in which classification information may be entered. In one example, the classification information may be in the form of one or more keywords associated with the content reference. Interface 500 may include other information, stored in the above or additional fields. For instance, an extended field 504 may be used to store an extended description of the content entered by the user. This extended field 504 may also include one or more tags or other classifying information that may be used to describe content.

According to one specific embodiment of the present invention, tag data may be developed using a social bookmarking system operated by multiple users. For instance, the well-known del.icio.us web service is a web service that provides users the ability to store and organize their bookmarks, share their bookmarks with others and find new bookmarks that may be of interest to them. According to one embodiment of the present invention, it is appreciated that a bookmarking system/service such as the del.icio.us service may be used to provide classification information for use in determining ad placement. Although various aspects of the present invention may be implemented with the del.icio.us web service, it should be appreciated that various aspects of the present invention may be implemented in other systems/services, and the invention is not limited thereto.

Figure 6:
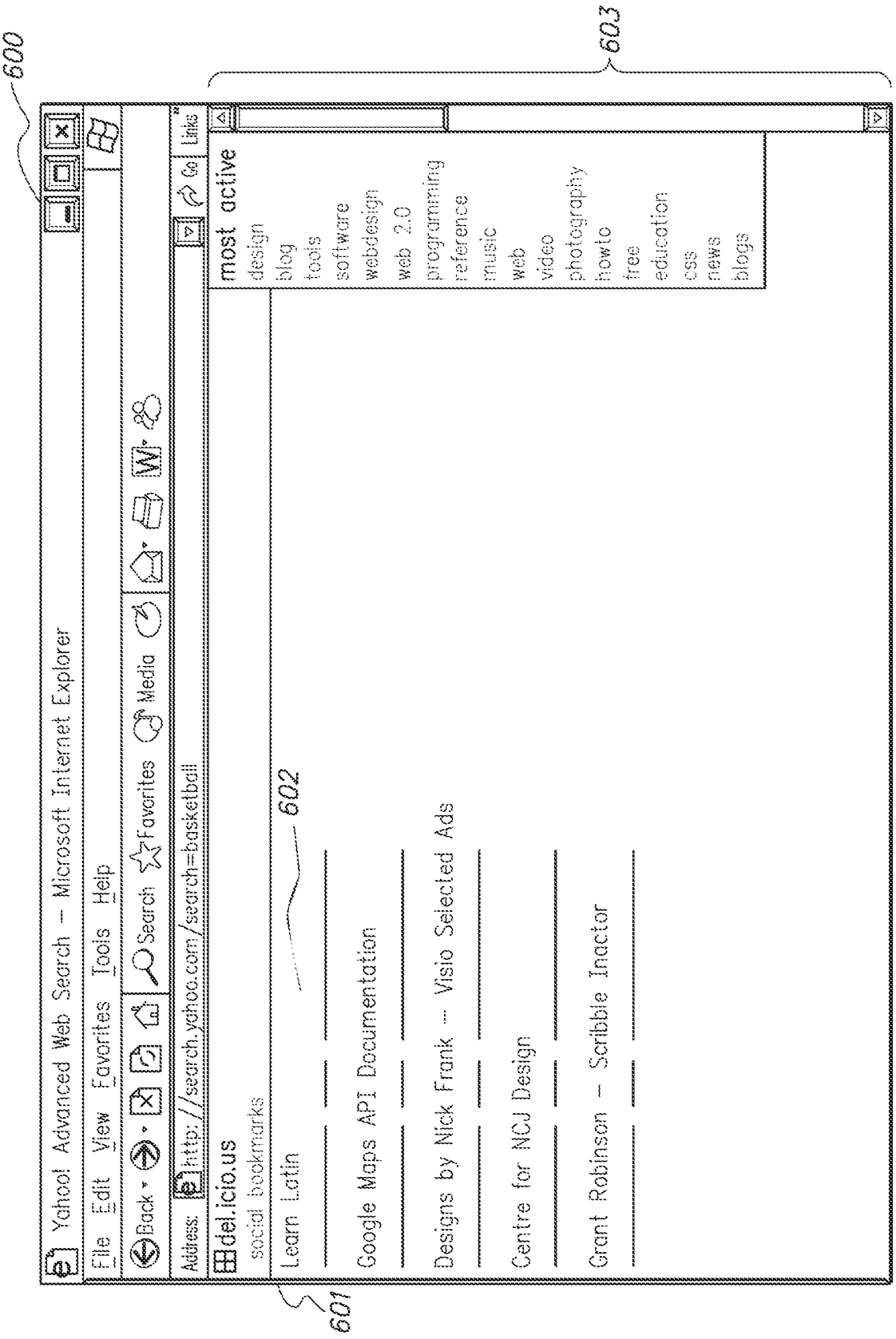
FIG. 6 depicts an example interface of a social bookmarking system that may be used to produce classification data according to one embodiment of the present invention.

As discussed, the del.icio.us system is a social bookmark management system. An interface of one such social bookmark management system is shown by way of example in FIG. 6. FIG. 6 depicts an interface 600 which may be, for example, a browser program interface (e.g., the Microsoft Windows Explorer browser). Within interface 600 may be displayed a main interface or page to a social bookmarking system (e.g., the del.icio.us system).

This interface may include one or more bookmarks (e.g., bookmark 601) that reference content, such as data stored on a website. Such data may be referenced by a link, such as a URL. Link data may be associated with each bookmark and stored in a database. For instance, link data may be collected from a user within an interface similar to interface 500 discussed above with reference to FIG. 5. Further, within an interface of the system, a bookmark may show an indication (e.g., indicator 602) of how many other users have bookmarked a particular portion of content.

The system allows users to easily add sites to a personal collection of links, to categorize those sites with keywords, and to share the collection not only between applications and systems, but also with other users. What makes the del.icio.us system a social bookmarking system is its ability to let users see links that other users have collected (e.g., a list of top-ranked bookmarks (e.g., list 603)), as well as showing other users who have bookmarked specific content (e.g., a website page referenced by a URL). Users can also view the bookmarks of links collected by others, and subscribe to bookmarks of people whose lists the user finds interesting.

According to one embodiment, tags are one-word descriptors that a user can assign to any reference to content (e.g., a bookmark). A user is permitted to assign as many tags to a bookmark as desired, and rename, delete, add or merge tags together. A selectable list (e.g., list 701 of FIG. 7) of all of the user's current tags may be displayed, for example, on the right-hand side of the user's personal page, together with the number of bookmarks that have that tag. A user can assign tags to an item when the user first submits a bookmark, or by selecting an "edit" link (e.g., element 705 of FIG. 7) next to an existing bookmark. In one example, tags are automatically created the first time the user uses them. In a user's personal page, such as the one shown in FIG. 7, a user can view an indicator (e.g., indicator 704) that shows how many other users have previously bookmarked a particular URL.

In another example interface, a user can merge, rename, or delete tags whenever desired by selecting the "settings" tab on the user's personal page, and selecting "tags" from the "Settings" menu (e.g., of menus 706) on the right side of the interface (e.g., interface 700) or by entering the URL http://del.icio.us/USERNAME/settings/tags in an address field of the browser interface. The user may be then presented a pull-down menu of all the user's current tags, along with a text field. To rename all instances of a tag, the user enters a new tag name in the text area. To merge two tags, a user selects the tag to be merged and renames the tag to the name of an existing tag. To split a tag into two or more pieces, a user enters multiple tags in "rename" field. To delete a tag, a user selects the tag from the pull down menu and selects a "Delete" button.

Features of the del.icio.us system can be broadly divided into the following four general functional areas:
Saving and Organizing Bookmarks To save bookmarks in the del.icio.us system, a user creates an account and installs a del.icio.us "bookmarklet." The bookmarklet is a program that adds a control (e.g., a button) to the browser's "links" or "bookmarks" toolbar. In one embodiment, the control acts similarly to the browser's built-in "bookmark this website" feature. In one specific example, the bookmark is stored on a server operated by the del.icio.us website. In another example, the feature may be part of an application (e.g., Explorer) or operating system, or may otherwise be previously installed on a client system.

After navigating to a website of interest and pressing the bookmark button, the user is presented with an interface with fields showing the URL of the currently viewed website, its title (editable) and additional fields for entering an optional paragraph-length description of the site and an optional list of free-form descriptive keywords. In the context of the del.icio.us system, keywords entered by a user to describe a particular bookmark are referred to hereinafter as "tags."

Figure 7:
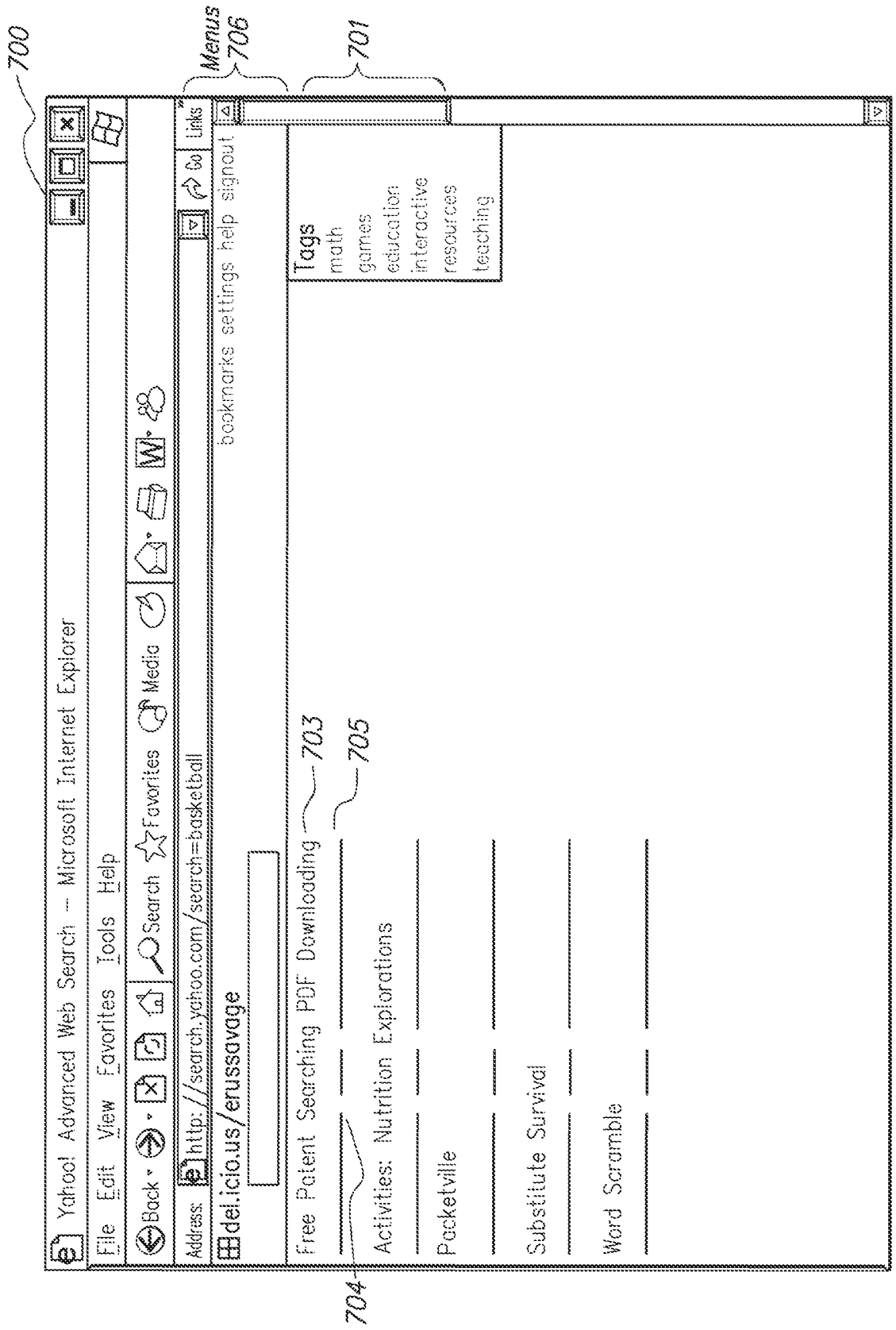
FIG. 7 depicts an example interface showing a personal page that may be used to classify data according to one embodiment of the present invention.

Bookmarks saved by the user are listed on a personal page created for the user referred to hereinafter as a "personal" page (e.g., as shown by way of example in FIG. 7). A section of this personal page also lists all the tags used by a user and the number of bookmarks tagged with a given tag. Selecting (e.g., by "clicking on") a tag name restricts the display of bookmarks to those tagged with that particular tag name. Additionally, a list of tags that have been used together with the selected tag is displayed as "related tags". Tag/related tag lists serve, for example, as mnemonic and navigational aids with which the user can locate bookmarks previously saved by other users.

Sharing and Finding New Content

The del.icio.us system provides several mechanisms for finding bookmarks of interest saved by other users. These mechanisms provide the "social" aspect of the del.icio.us system.

The front page of the del.icio.us service (e.g., interface 600 of FIG. 6) may show an updated list of the top URLs bookmarked (and, therefore, classified) by del.icio.us users (e.g., list 603).

A page of recently popular URLs may be presented, upon which the URLs most frequently bookmarked by users are listed in order of popularity. Popularity may be determined, for example, by a ranking of the number of times a particular URL has been classified over a specified period of time.

Each listed URL may include a selectable numerical indicator (e.g., indicator 602) of how many other users have bookmarked the URL. Upon selection of the indicator, a list may be displayed of all bookmarks of that URL as described and tagged by others. This feature allows a user to find other users having similar interests.

Users are allowed to navigate to pages listing the bookmarks by all users for a particular tag. This feature allows, for example, the user to find URLs about a particular topic. Users can subscribe to other user's bookmark lists, a particular tag used by a given user or bookmarks tagged with a given tag.

An aggregated list of the user's defined tags may be shown on a user's "inbox" page, allowing the user to create and track a personalized feed of content of interest.

Syndication and Publishing

Various pages, such as, for example, user personal pages, main page, popular page, global and per-user tag pages, or other pages may be made available as RSS feeds, allowing users to subscribe to them with online or desktop aggregators and form their own custom views on the del.icio.us system classification data. A user can, for instance, use RSS feeds provided by the del.icio.us system to add the del.icio.us popular content to his or her my.yahoo.com page or view their personal inbox through, for example, the well-known Firefox browser's Live Bookmarks feature. Additionally, the del.icio.us system can periodically post the user's recent bookmarks to a user's blog, automating the maintenance of link blogs. Similarly, an organization (e.g., an advertiser) may subscribe and/or publish classification data.

Integration and Extension

The del.icio.us system provides a REST-style open programmatic application program interface (API) to a user's own content. A set of API calls are provided that mimic the functionality generally available to a user. That is, the API calls mimic the storing, editing, categorizing and retrieving functions performed with bookmarks and their associated information. This functionality allows third-party developers to develop tools that implement the del.icio.us system and integrate del.icio.us features into other products. Many tools have been developed, including, but not limited to del.icio.us extensions for several popular browsers, desktop clients, API bindings for popular programming languages and others.

According to one embodiment, such interfaces may be leveraged to permit other applications, operating systems, and/or computer systems to share classification data. In this way, classification data is more easily shared, and effort for classifying data in separate applications, computer systems, etc. are reduced. Further, the quality of classification data is increased as more entities (applications, computers, users) share and add to the classification data.

del.icio.us Technology

The del.icio.us system is, in one example, a database-driven system including a database interface program loaded on a client with the database being located on a server system. For instance, the del.icio.us system may include an architecture similar to system 200 as discussed above with reference to FIG. 2. In one embodiment, URL link and tag information posted by users may be stored, for example, in a relational database for later retrieval. The database information may, according to another embodiment, be broken up and distributed across several tables to enable fast processing of queries. Further, the system may maintain link and tag information posted by users in a structured format (e.g., XML). Full-text indexing and distributed inverse indices may be used to locate information for retrieval.

Although various aspects of the present invention may be used with the del.icio.us system, it should be appreciated that other systems, services, and/or applications may be used. Further, systems having different components or architecture may be used to collect, store, and interpret classification data. Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method, comprising:
    collecting, by a computing system over one or more networks and from a plurality of client devices associated with a plurality of users, a first plurality of bookmarks for a first plurality of network-accessible content;
    generating, by the computing system for at least a portion of the plurality of users, a plurality of personal user pages including at least a first personal page for a first user and a second personal page for a second user, wherein each of the plurality of personal user pages includes bookmarks of the first plurality of bookmarks that are associated with a respective user of the plurality of users;
    receiving, by the computing system from a first client device associated with the first user of the plurality of users and over the one or more networks, a request from the first user to subscribe to data from a second user including at least one of bookmark lists of the second user, a tag used by the second user, or bookmarks tagged with a given tag within the second personal page of the second user, wherein the second user is different than the first user and the second personal page of the second user includes a second plurality of bookmarks of the first plurality of bookmarks;
    applying, by the computing system, a feed to track and aggregate the data from the second personal page of the second user corresponding to the request from the first user; and
    sending, by the computer system, aggregated data via the feed in response to the request from the first user, the aggregated data to be displayed along with other content on the first personal page of the first user.

2. The computer-implemented method of claim 1, wherein a location of the first network-accessible content is included in a bookmark data collected from the second user.

3. The computer-implemented method of claim 2, wherein the bookmark data includes a second tag that specifies how information corresponding to the first network-accessible content will be presented.

4. The computer-implemented method of claim 1, wherein collecting further includes:
collecting a ranking data that indicates a ranking of the first network-accessible content among at least a portion of the first plurality of network-accessible content.

5. The computer-implemented method of claim 1, further comprising:
receiving a classification data for the first network-accessible content.

6. One or more non-transitory computer-readable media storing instructions which, when processed by one or more processors, cause at least:
collecting, by the one or more processors and over one or more networks from a plurality of users, a first plurality of bookmarks for a first plurality of network-accessible content posted by the plurality of users;
generating, by the one or more processors and for at least a portion of the plurality of users, a plurality of personal user pages including at least a first personal page for a first user and a second personal page for a second user, wherein each of the plurality of personal user pages includes bookmarks of the first plurality of bookmarks that are associated with a respective user of the plurality of users;
receiving, by the one or more processors and from a first client device associated with the first user of the plurality of users and over the one or more networks, a request from the first user of the plurality of users to subscribe to data from a second user including at least one of bookmark lists of the second user, a tag used by the second user, or bookmarks tagged with a given tag within the second personal page of the second user, wherein the second user is different than the first user and the second personal page of the second user includes a second plurality of bookmarks of the first plurality of bookmarks; and
applying, by the one or more processors, a feed to track and aggregate the data from the second personal page of the second user corresponding to the request from the first user; and
sending, by the one or more processors and to the first client device, aggregated data via the feed in response to the request from the first user, the aggregated data to be displayed along with other content on the first personal page of the first user.

7. The one or more non-transitory computer-readable media as recited in claim 6, further comprising additional instructions which, when processed by the one or more processors, cause at least:
providing a subscription feature that allows the first user to subscribe to the second personal page of the second user.

8. The one or more non-transitory computer-readable media as recited in claim 7, wherein the subscription feature allows the first user to subscribe to the personal user page of the second user and subscribe to a third personal page of a third user of the plurality of users.

9. The one or more non-transitory computer-readable media as recited in claim 6, further comprising additional instructions which, when processed by the one or more processors, cause at least:
collecting, from the second user, one or more tags corresponding to the first network-accessible content.

10. The one or more non-transitory computer-readable media as recited in claim 9, wherein the one or more tags specify how the first network-accessible content will be presented.

11. The one or more non-transitory computer-readable media as recited in claim 6, further comprising additional instructions which, when processed by the one or more processors, cause at least:
collecting a ranking data of the first network-accessible content among at least a portion of the first plurality of network-accessible content.

12. The one or more non-transitory computer-readable media as recited in claim 6, further comprising additional instructions which, when processed by the one or more processors, cause at least:
receiving classification data selected for the first network-accessible content; and
storing the classification data with the first network-accessible content.

13. The one or more non-transitory computer-readable media as recited in claim 6, further comprising additional instructions which, when processed by the one or more processors, cause at least:
storing one or more of the first network-accessible content, a description of the first network-accessible content, a keyword corresponding to the first network-accessible content, a network address for the first network-accessible content, a ranking of the first network-accessible content, a classification of the first network-accessible content, or an indicator of how many other users have bookmarked the first network-accessible content.

14. A system, comprising:
one or more processors; and
a memory storing program instructions that, when executed by the one or more processors, cause the one or more processors to at least:
collect, by the system and over one or more networks from a plurality of users, a first plurality of bookmarks for a first plurality of network-accessible content;
generate, by the system and for at least a portion of the plurality of users, a plurality of personal user pages including at least a first personal page for a first user and a second personal page for a second user, wherein each of the plurality of personal user pages includes bookmarks of the first plurality of bookmarks that are associated with a respective user of the plurality of users;
receive, by the system and from a first client device associated with the first user, a request to subscribe to data from a second user including at least one of bookmark lists of the second user, a tag used by the second user, or bookmarks tagged with a given tag within the second personal page of the second user, wherein the second personal page of the second user includes a second plurality of bookmarks posted by the second user that reference a second plurality of network-accessible content;
apply, by the system and to the first client device associated with the first user, a feed to track and aggregate the data from the second personal page of the second user corresponding to the request from the first user; and
send, by the system, aggregated data via the feed in response to the request from the first user, the aggregated data to be displayed along with other content on the first personal page of the first user.

15. The system of claim 14, wherein the program instructions that, when executed by the one or more processors, further cause the one or more processors to at least:
   collect, from the second user, bookmark data comprising a plurality of bookmarks for the second plurality of network-accessible content that were posted by the second user, wherein at least one bookmark data includes a location of the first network-accessible content.

16. The system of claim 15, wherein the at least one bookmark data further includes one or more of a second tag corresponding to the first network-accessible content, a ranking data corresponding to the first network-accessible content, or a classification data corresponding to the first network-accessible content.

17. The system of claim 14, wherein the program instructions that, when executed by the one or more processors, further cause the one or more processors to at least:
   provide a subscription feature that allows the first user to subscribe to information collected from the second user.

18. The system of claim 14, wherein the program instructions that, when executed by the one or more processors, further cause the one or more processors to at least:
   store one or more of the first network-accessible content, a description of the first network-accessible content, a keyword corresponding to the first network-accessible content, a location of the first network-accessible content, a ranking of the first network-accessible content, a classification of the first network-accessible content, or an indicator of how many users of a plurality of users have bookmarked the first network-accessible content.

* * * * *